US005574768A

United States Patent [19]

McLean

[11] Patent Number: 5,574,768
[45] Date of Patent: Nov. 12, 1996

[54] SCREEN FILM CASSETTE

[75] Inventor: Donald McLean, Springwood, Australia

[73] Assignee: The University of Sydney, Sydney, Australia

[21] Appl. No.: 525,415

[22] Filed: Sep. 8, 1995

Related U.S. Application Data

[63] Continuation-in-part of Ser. No. 347,561, Nov. 30, 1994, abandoned.

[30] Foreign Application Priority Data

May 26, 1994 [AU] Australia ................. PM5890

[51] Int. Cl.$^6$ .................................................. G03B 42/02
[52] U.S. Cl. .................. 378/185; 378/186; 378/182; 250/487.1
[58] Field of Search .................. 378/182, 169, 378/172, 173, 183, 185, 186, 187, 188; 250/483.1, 486.1, 487.1

[56] References Cited

U.S. PATENT DOCUMENTS

| | | | |
|---|---|---|---|
| 2,247,451 | 7/1941 | Rawls | 378/186 |
| 4,983,021 | 1/1990 | Bollen et al. | 378/185 |
| 5,070,248 | 12/1991 | Pesce | 378/182 |
| 5,461,660 | 10/1995 | Dooms et al. | 250/487.1 |

OTHER PUBLICATIONS

McLean, I. D. et al., "Twin Screen–Film Chest Radiography: Cost–effective Lung and Mediastinal Imaging," *Radiology*, vol. 190, No. 2, pp. 621–622, (Australia, Feb. 1994).

*Primary Examiner*—Don Wong
*Attorney, Agent, or Firm*—Olson & Hierl, Ltd.

[57] ABSTRACT

A screen film cassette for radiographic use. The cassette includes front and rear screen-film combinations housed in container, and each screen-film combination includes a pair of intensifying screens which sandwich a film. A dividing filter is located between the two screen-film combinations to improve X-ray beam intensity incident on the back screen-film combination. The filter also reduces the transfer of visible light energy or K-characteristic photon energy, generated in one screen-film combination during the imaging process, to the adjacent screen-film combination. The invention provides for improved radiographic film contrast and image resolution.

7 Claims, 4 Drawing Sheets

SCREEN FILM CASSETTE

RELATED APPLICATION

This application is a continuation-in-part of U.S. patent application Ser. No. 08/347,561 filed Nov. 30, 1994, now abandoned.

FIELD OF THE INVENTION

This invention relates to a screen film cassette for radiographic use.

BACKGROUND OF THE INVENTION

Conventional screen-film radiography does not allow high contrast visualisation of both the lung and mediastinal regions of the chest due predominantly to the large radiographic attenuation differences between lung and mediastinal regions of the chest and to the significant scatter component that exits from the mediastinum. The extent of radiographic attenuation differences between the lung and mediastinum has been measured and studies of the scatter component of the exit beam from the chest have been recorded. The scatter-to-primary ratio exiting from the mediastinum is almost ten times greater than that which has been measured exiting from the lungs. Large inter-patient variations for both mediastinum and lung regions have also been noted.

Various attempts have been made to resolve this problem, including the use of beam filtration devices, beam scanning devices, improved imaging receptors and digital imaging techniques.

Also, systems have been proposed and developed that involve the use of more than one film to capture an image from a single exposure in a number of cases, including in tomography, dentistry, mammography, chest and intensive care situations. A tomographic "book cassette" employs multiple screen-film combinations but suffers from reduced image quality due to increased scatter on the lower films in the cassette and from difficulty in equalising the radiographic density on all films.

Double-loading of two films in a single screen pair has been employed for producing two identical films. Furthermore, two films have been used in dental radiography as a method of halving the patient dose, and a thin tin foil has been located between two unscreened film packs to permit viewing of the skin line in mammography. Also, a dual screen-film cassette system has been used to expand the dynamic range in chest radiography, but without any filter being used.

However, none of the above approaches has provided for high contrast visualisation of regions, such as the lung and mediastinal regions of the chest, that exhibit different attentuating characteristics.

SUMMARY OF THE INVENTION

The present invention seeks to resolve this problem by providing a radiographic screen-film cassette which contains front and rear screen-film combinations. In contrast with the various abovementioned prior art approaches, each of the front and rear screen-film combinations includes a pair of intensifying screens which sandwich a film and a dividing filter is located between the two combinations.

The filter functions to improve the X-ray beam intensity incident on the back screen-film combination and reduces the transfer to the adjacent screen-film combination of visible light energy, or K-characteristic photon energy, which is generated in one screen-film combination during the imaging process. This gives rise to an improvement in radiographic film contrast and image resolution.

The filter may be produced from almost any metallic material. Most suitable are materials with atomic numbers from 20 to 50 and preferred materials include copper, iron alloys, silver, molybdenum and tin.

A particularly preferred filter comprises a 0.25 mm thick copper sheet coated with silver to a thickness between 0.015 and 0.025 mm. The silver coating most preferably has a thickness of 0.021 mm.

Another suitable filter material is stainless steel, AISI Type 304.

Any known screen phosphor material has the potential to be used in the cassette of the present invention. Screen phosphors currently used include yttrium tantalate ($YTaO_4$), barium fluorobromide ($BaFBr$, I), lanthanum oxybromide ($LaOBr$), and calcium tungstate ($CAWO_4$). Although these screen phosphors are in common use, they form a small sub-set of the phosphor materials that currently are available and which could be used in the cassette of the present invention.

A preferred screen material is gadolinium oxysulphide ($Gd_2O_2S$). The Eastman Kodak company makes a range of screen products using gadolinium oxysulphide, as do other screen manufacturers including E. I. DuPont, Agfa, 3M and Fuji.

So-called Lanex Medium screens (manufactured by Eastman Kodak, Rochester, N.Y., U.S.A.) are suitable for both the front and back pair of screens in the cassette of the present invention.

Other screens that are distinguished by the thickness of phosphor, known as the coat weighting, may also be employed. Lanex Fine has a low coat weighting, whereas Lanex Medium, Lanex Regular and Lanex Fast screens have increased coat weightings.

A lead foil barrier may be placed behind the rear screen-film combination in the cassette of present invention.

Preferred embodiments of the invention will now be described by way of example with reference to the accompanying drawings.

DETAILED DESCRIPTION OF THE INVENTION

Figure 1A:
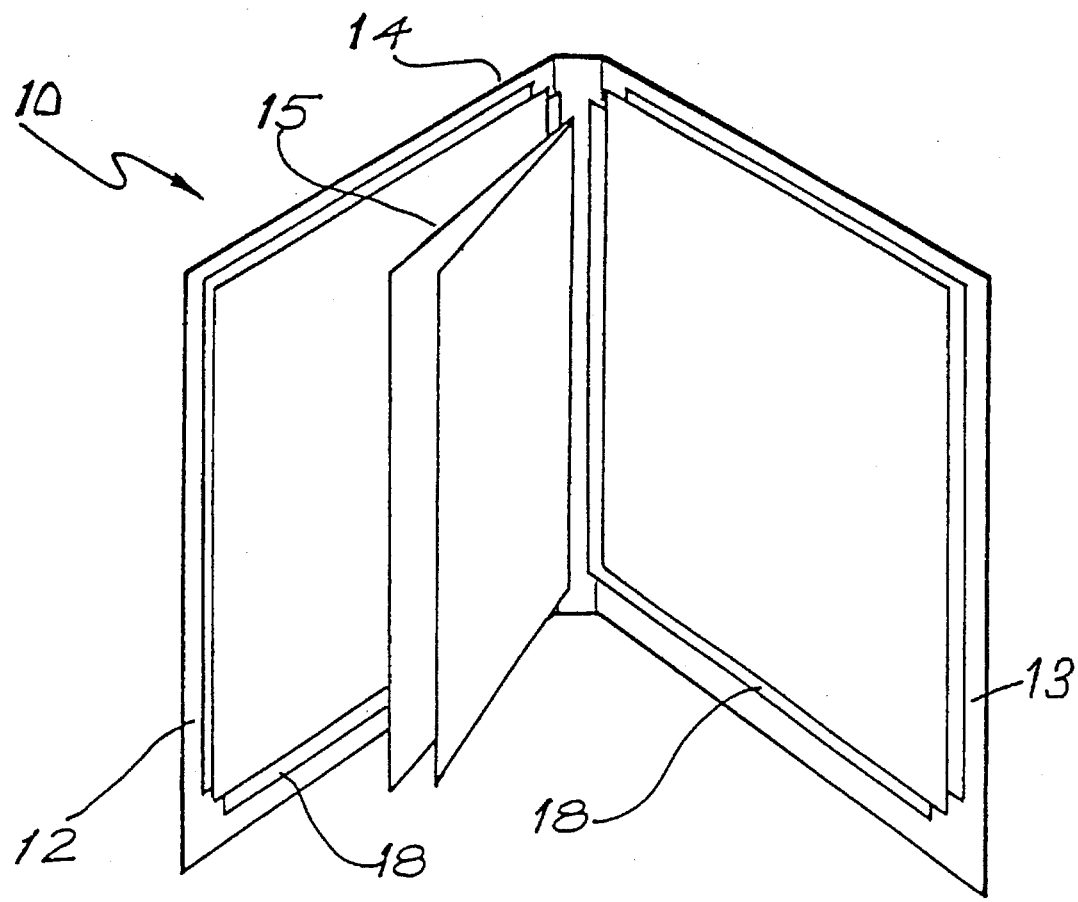
FIG. 1A shows an open view of a twin screen-film cassette embodying the present invention.
Figure 1B:
FIG. 1B shows an end view of the cassette which is illustrated in FIG. 1A.

As shown in FIGS. 1A and 1B of the drawings, the twin screen-film cassette 10 comprises two screen-film combinations 12 and 13 housed in a radiographic cassette 14. Each of screen-film combinations 12 and 13 comprises a pair of intensifying screens 16 and 17 which sandwich a film 18. A dividing filter 15 is located between the two screen-film combinations.

The front screen-film combination 12 is employed to record an optimised mediastinal image and the back screen-film combination 13 is provided to record an optimised lung image. The function of the dividing filter is firstly to modify the X-ray beam intensity incident upon the back screen-film combination, secondly to optically isolate the front and back screen-film combinations and thirdly to radiographically isolate the front and back screen-film combinations so as to reduce the amount of K-characteristic photon transfer between the front and back combinations.

Figure 2:
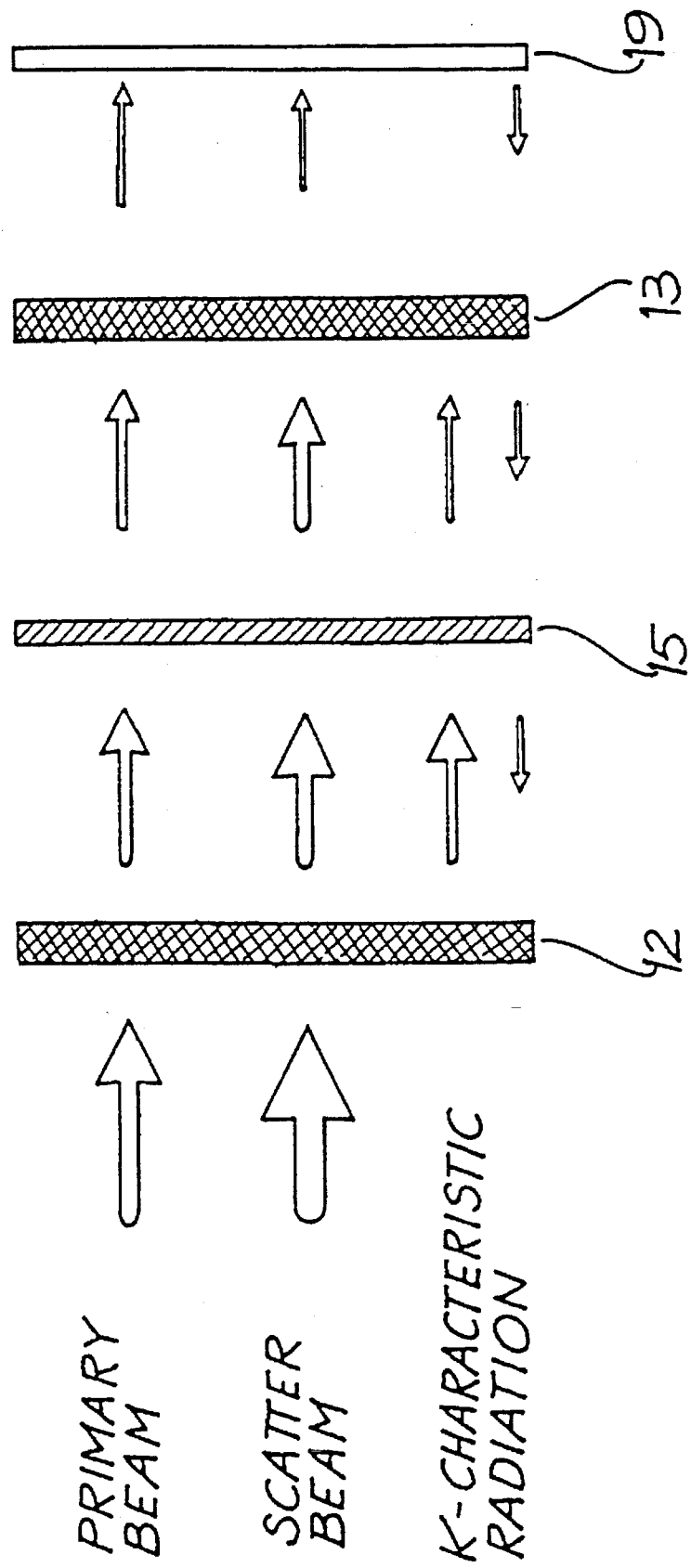
FIG. 2 shows a schematic representation of photon transfer within the twin screen-film cassette embodying the invention.

FIG. 2 of the drawings shows the X-ray beam contributions that are relevant to the design of a twin screen-film image receptor. The scatter component is potentially the largest contributor to film density in chest radiography, and must be reduced to allow high contrast images. The primary X-ray beam decreases as it passes through the cassette, allowing low intensity mediastinal images to be captured on the front screen-film combination 12, and the high intensity lung images to be captured on the back screen-film combination 13. K-characteristic radiation is also generated by the intensifying screens within the cassette.

In one embodiment of the twin screen-film cassette as shown in the drawings, Lanex Medium (gadolinium oxysulphide) screens are employed in both the front and back screen-film combinations 12 and 13 to facilitate good resolution characteristics, particularly for the optimised lung image film. A composite film, composed of a 0.25 mm thick sheet of copper coated with a 0.02 mm thick layer of silver is employed for the dividing filter 15. The higher atomic number materials are selected to reduce the filter thickness and to assist in absorption of the K-characteristic photons emitted from the screens.

The log exposure difference between the front and back screen pairs has been determined in narrow beam geometry at 60, 80, 100 and 120 kVp utilising sensitometric curves in the normal manner. Measurements in full scatter conditions have also been made, at 70 kVp with a 7.6 cm thick acrylic phantom and at 100 kVp with a 23 cm acrylic phantom.

Table 1 (next page) shows the log exposure differences measured between the front and back screens.

TABLE 1

| Log relative exposure difference between the front and back screen film combinations | | | |
|---|---|---|---|
| kVp | Measured log exposure | Calculated log exposure | Ratio[a] |
| 60[b] | 1.03 | 1.04 | 1.01 |
| 70[c] | 1.00 | 1.02 | 1.02 |
| 80[b] | 0.80 | 0.85 | 1.07 |
| 100[b] | 0.75 | 0.82 | 1.09 |
| 100[c] | 0.81 | 0.86 | 1.06 |
| 120[d] | 0.39 | 0.44 | 1.13 |

[a] calculated to measured.
[b] Three phase X-ray unit with a total filtration of 4 mm aluminium, narrow beam geometry.
[c] as in [b] but measured in full scatter conditions using a 30 cm² input field size.
[d] Three phase X-ray unit with a total filtration of 4 mm aluminium + 1 mm copper, narrow beam geometry From these results it is clear that the separation between the front and back screen increases as beam energy decreases. It is also seen at 100 kVp, that scattered radiation in the beam also increases the exposure difference between the screen pairs in the cassette.

A sensitometric (characteristic) curve has also been derived for a typical single screen-film combination (i.e., a Kodak Thoracic Insight System) for comparative purposes. This characteristic curve was determined in narrow beam geometry at 120 kVp with 1 mm of copper added to the beam to simulate the clinical operating conditions of this screen-film system.

Figure 3:
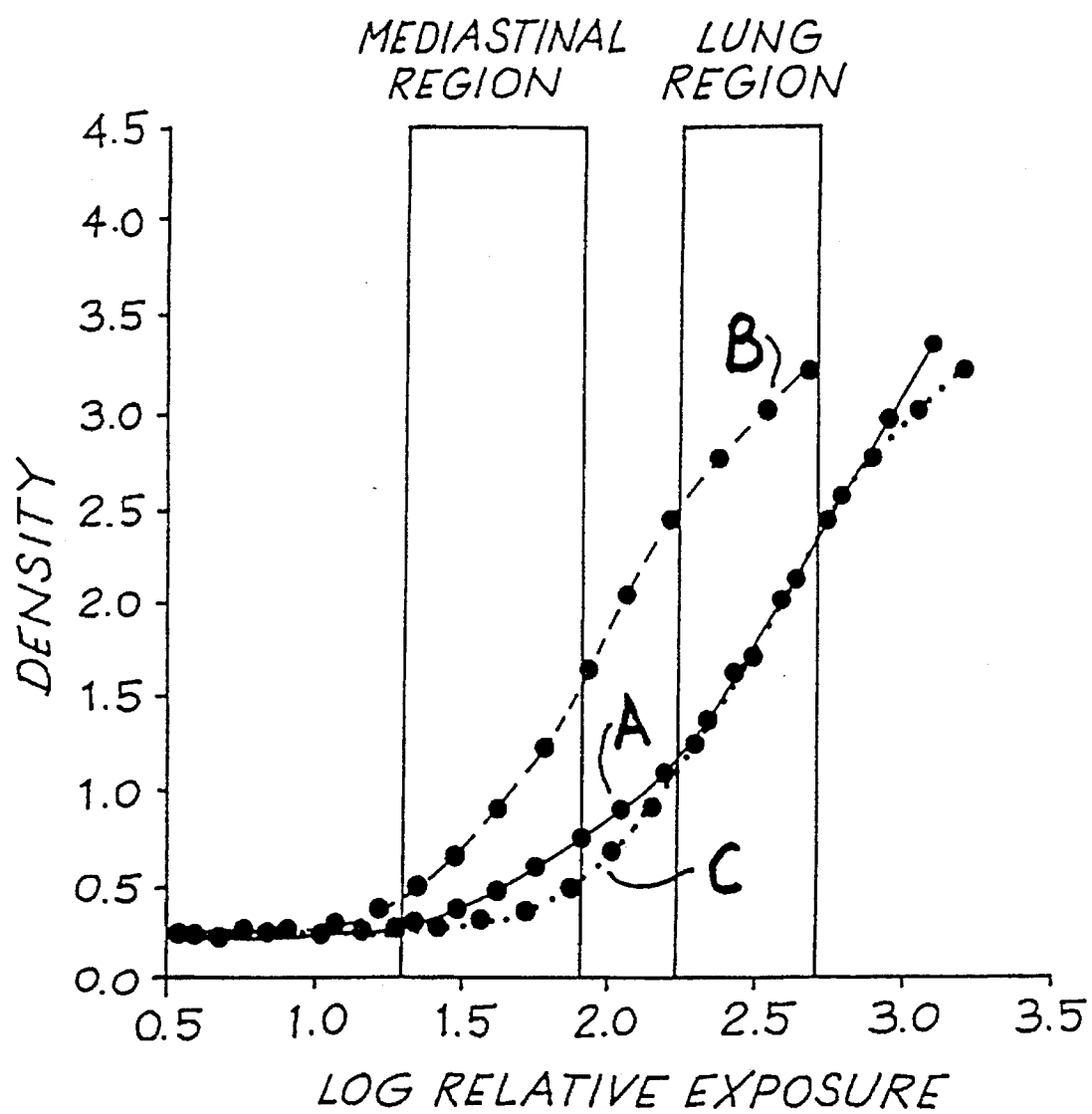
FIG. 3 shows graphs of characteristic curves for A—a typical single screen-film combination, B—the front screen-film combination of the twin cassette embodying the present invention, and C—the rear screen-film combination of the twin cassette embodying the present invention.
Figure 4:
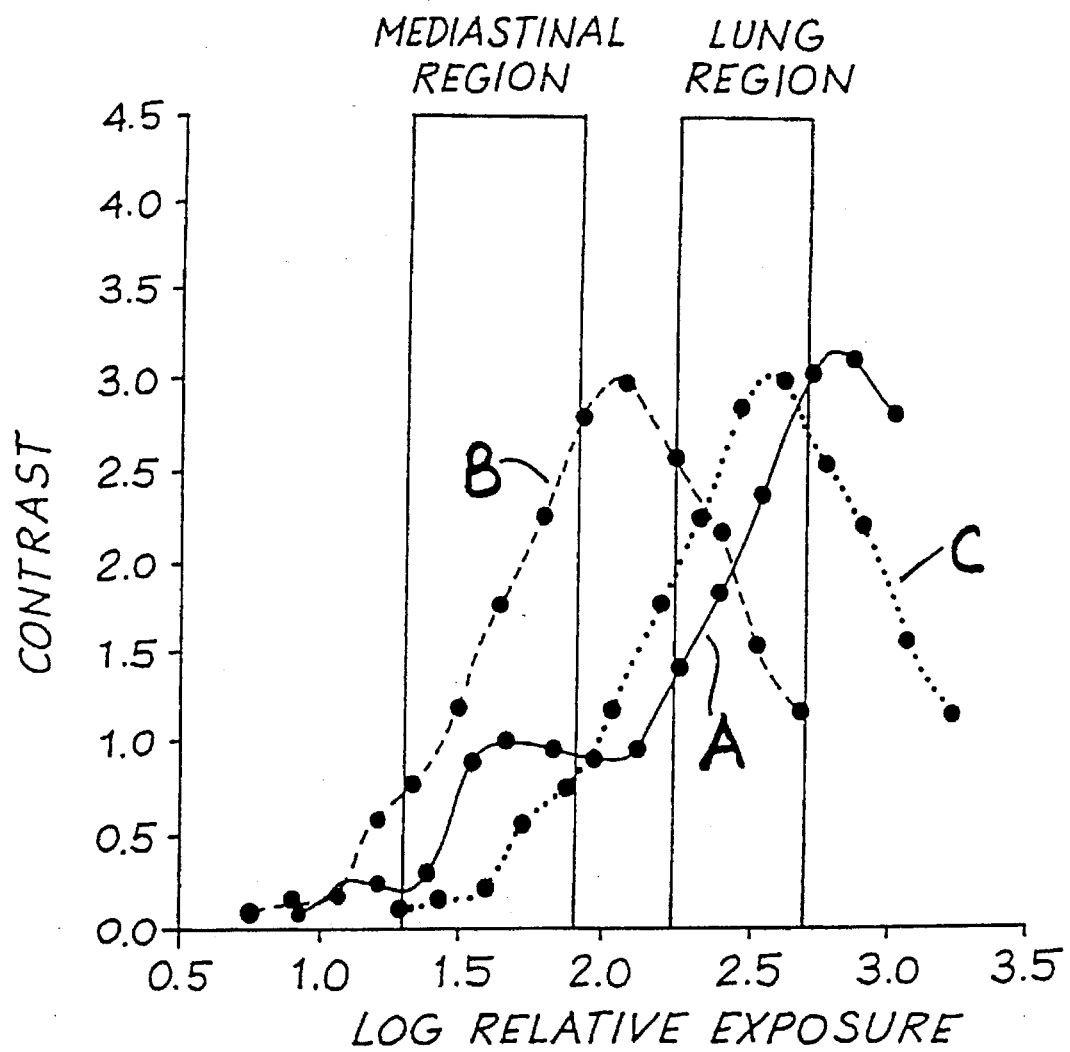
FIG. 4 shows a graph of contrast verses log relative exposure curves for A—a typical single screen-film combination, B—the front screen-film combination of the twin cassette embodying the present invention, and C—the rear screen-film combination of the twin cassette embodying the present invention.

FIG. 3 shows the measured characteristic curves (B and C) for the front and back screen-film combinations of the twin cassette and shows also the comparative characteristic curve (A) for the Insight System. In the log relative exposure region corresponding to the lung regions, both the Insight System and the back film of the twin screen-film system of the present invention exhibit similar densities. In the mediastinal regions the Insight System shows significantly higher densities than the back (or optimal lung) film of the twin screen-film system of the present invention. However the front film shows in the twin screen-film system of the present invention shows increased density for all regions of the mediastinum. FIG. 4 shows film contrast as a function of log relative exposure. The comparative Insight System film shows in curve A a slight reduction in contrast compared with the twin screen-film system curves B and C at lung exposure levels. At mediastinal exposure levels the contrast of the twin screen-film system front film is greatly increased when compared with the extended latitude of the Insight System film.

The effect of visible light transfer has been measured for gadolinium oxysulphide screens in the twin screen-film system of the present invention. For this purpose two arrangements were measured, both using Lanex Medium screens as the back screen pair. A Lanex Medium screen pair was used as the front screen pair for one arrangement and a Lanex Fast screen pair for the other. Each cassette arrangement was exposed in narrow beam geometry at 80, 100 and 120 kVp, with visible light transfer being measured on the back screen. A small optical attenuator was placed between the two screen pairs. Measurements were made both with and without unexposed film placed between the front screen pair.

Table 2 (next page) shows the magnitude of visible light transfer when no filter is present between adjacent gadolinium oxysulphide screens.

TABLE 2

| Percent of visible transferred light exposure compared to primary X-ray beam exposure[a] | | | |
|---|---|---|---|
| Front Screen | 80 kVp | 100 kVp | 120 kVp |
| Lanex Fast | 23.3[b] (10.3)[c] | 22.8 (9.2) | 19.4 (7.9) |
| Lanex Medium | 6.6 (2.5) | 5.4 (4.0) | 5.2 (1.9) |

[a] Density detected on Lanex Medium-TML back screenfilm combination
[b] No film in front screen pair
[c] Undeveloped TML film placed in front screen pair No beam energy affects are seen. The contribution from visible light transferred from adjacent screens is greater when faster screen types are used. A 0.05 optical density increase for the Lanex Medium system and a 0.2 optical density increase for the Lanex Fast system can be observed.

Intensifying screens conventionally emit significant amounts of K-characteristic radiation under clinical diagnostic exposure conditions. The magnitude of K-characteristic photon transfer from the front screen to the back screen has been measured for the two sets of conditions indicated in Table 3 shown in the following page:

TABLE 3

Estimate of K-characteristic to primary absorbed screen energy for the twin screen-film cassette

| Cassette configuration | Optical density[a] | Relative exposure[b] | Optical density[c] | Relative exposure |
|---|---|---|---|---|
| Front screen and filter out of cassette | 0.76 | 1.00 | 1.16 | 1.00 |
| Front screen and filter within cassette | 0.80 | 1.06 | 1.19 | 1.03 |
| Filter only out of cassette | 1.00 | 1.24 | 1.35 | 1.17 |

[a]Lanex Fast front screens, exposed at 100 kVp with 7.6 cm of lucite added filtration.
[b]Relative exposure
[c]Lanex Medium front screens, exposed at 120 kVp with 10.1 cm of lucite added filtration In deriving the results shown in Table 3, the twin screen-film cassette was configured with Lanex Medium screens in the back position and, in alternative arrangements, with Lanex Medium and Lanex Fast screens in the front position. The composite copper-silver filter 15 was used. A tube focus to film distance of 200 cm was used with a monitor chamber placed 90 cm from the tube focus. Three radiographs were taken for each case and the optical density of the back film recorded. The first radiograph was made in the usual manner, with both sets of screens and filter assembly within the cassette. A second exposure was made, this time with the composite filter removed from the cassette and replaced by an optical attenuator. The filter was still retained in the X-ray beam, being placed 50 cm in front of the twin screen-film cassette. Lastly the front set of screens was removed from the cassette and placed next to the removed filter, again in front of the cassette. From the resultant densities the relative exposures on the film were determined sensitometrically, and then normalised by the monitor chamber exposure.

From Table 3 it can be seen that for the Lanex Medium screens as the front screen pair configuration, 17% of additional energy is absorbed in the back screens, due to characteristic photon transfer if the filter is not present. Higher levels are recorded with thicker intensifying screens such as Lanex Fast. The filter is seen to reduce this photon transfer considerably to 3% and 6% of the back screen energy absorbed for Lanex Medium and Lanex Fast front screens respectively.

Isotropically emitted K-characteristic photons can be expected to be absorbed in the front as well as the back screen. This possibility has been investigated by placing small samples of Lanex Medium screen behind a front Lanex Medium screen-film combination in a twin cassette and measuring the density changes seen on TML film following exposure of the cassette by a 120 kVp X-ray beam with 1 mm of copper additional filtration. The effect of possible fluorescence from a lead foil 19 (FIG. 2) was also investigated. The lead foil 19, having an approximate thickness of 60 μm, was taped behind a Lanex Medium screen-film combination and similarly radiographed.

A slight K-characteristic photon transfer effect in the forward direction, from Lanex Medium screens mounted behind the front screens, was detected and measured as giving 1.7% of additional exposure to the front screen. Lead foil placed behind Lanex Medium screens was also shown to contribute additional exposure as is shown in Table 4 which appears on the next page:

TABLE 4

Lead fluorescence detected by Lanex Medium screens in front of various thicknesses of lead foil[a]

| Beam Conditions | 60 μm | 120 μm | 240 μm |
|---|---|---|---|
| 120 kVp + 1 mm copper added filtration | 0.8% | 1.7% | 2.5% |
| 120 kVp + 1 mm copper + Lanex Fast screen pair + composite filter | 3.1% | 3.5% | 4.5% |

[a]Absorbed energy due to lead K-characteristic photons as a percentage of the absorbed energy due to the primary beam.

It can be seen that, particularly for penetrating beams such as are used in chest radiography, that K-characteristic photons emitted from the lead foil backing in radiographic cassettes cause a measurable effect on radiographic film.

The resolution of the twin screen-film system was investigated using a resolution test pattern (Nuclear Associates No. 07-531). The high contrast resolution of both the front and back screen pairs were measured in narrow beam geometry at 120 kVp.

The twin screen-film cassette resolution was measured, using one observer, as 4 cy/mm for both the front and back screen systems.

The twin screen-film system described, has an in air entrance dose of approximately 0.4 mGy for a typical adult PA chest. While this is two to three times higher than a corresponding screen-film PA chest radiograph, it is lower than input chest exposures currently used for computed radiography. The patient dose required for computed radiography, at high kVp chest exposures has been compared to Lanex Regular and Medium screen systems, to give equivalent detection of 0.5 to 2.0 cm diameter objects. Increases in patient doses from 75 to 100% were found necessary for the computed radiography system, due to the low detective quantum efficiency (DQE) of these systems.

I claim:

1. A radiographic screen-film cassette comprising a container, front and rear screen-film combinations housed within the container, each of the screen-film combinations including a pair of intensifying screens and a film sandwiched by the screens, and a dividing filter located between the two screen-film combinations.

2. The cassette as claimed in claim 1 wherein the filter is formed from a metallic material.

3. The cassette as claimed in claim 2 wherein the metallic material has an atomic number within the range from 20 to 50.

4. The cassette as claimed in claim 2 wherein the metallic material comprises one or more of the metals copper, iron alloy, silver, molybdenum and tin.

5. The cassette as claimed in claim 2 wherein the filter comprises a copper sheet have a silver surface coating.

6. The cassette as claimed in claim 5 wherein the copper sheet has a thickness in the order of 0.25 mm and the silver surface is 0.015 to 0.025 mm thick.

7. The cassette as claimed in claim 6 wherein the silver coating is 0.021 mm thick.

* * * * *